(12) United States Patent
Huang et al.

(10) Patent No.: US 7,973,688 B2
(45) Date of Patent: Jul. 5, 2011

(54) PHOTONIC FILTER BANK FOR HIGH-SPEED ANALOG-TO-DIGITAL CONVERSION

(75) Inventors: Yue-Kai Huang, Princeton, NJ (US); Ting Wang, Princeton, NJ (US); Philip Nan Ji, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 12/200,219

(22) Filed: Aug. 28, 2008

(65) Prior Publication Data

US 2009/0251345 A1 Oct. 8, 2009

Related U.S. Application Data

(60) Provisional application No. 61/042,885, filed on Apr. 7, 2008.

(51) Int. Cl.
*H03M 1/00* (2006.01)
(52) U.S. Cl. ........ 341/137; 341/118; 341/120; 341/121; 341/155
(58) Field of Classification Search .................. 341/137, 341/155, 118–121
See application file for complete search history.

(56) References Cited

U.S. PATENT DOCUMENTS

| | | | | |
|---|---|---|---|---|
| 5,010,346 | A * | 4/1991 | Hamilton et al. | 341/137 |
| 6,118,396 | A * | 9/2000 | Song | 341/137 |
| 6,264,610 | B1 * | 7/2001 | Zhu | 600/443 |
| 6,265,999 | B1 * | 7/2001 | Prucnal | 341/137 |
| 6,326,910 | B1 * | 12/2001 | Hayduk et al. | 341/137 |
| 6,429,939 | B1 * | 8/2002 | Bennett et al. | 356/463 |
| 6,473,013 | B1 | 10/2002 | Velazquez et al. | |
| 6,525,682 | B2 * | 2/2003 | Yap et al. | 341/137 |
| 6,707,541 | B1 * | 3/2004 | Noe | 356/73.1 |
| 6,781,533 | B2 * | 8/2004 | Yap et al. | 341/143 |
| 6,980,147 | B2 * | 12/2005 | Mathis et al. | 341/155 |
| 7,161,511 | B2 * | 1/2007 | Koste et al. | 341/118 |
| 7,267,252 | B2 * | 9/2007 | Goodman | 223/85 |
| 7,463,362 | B2 * | 12/2008 | Lasker et al. | 356/497 |
| 7,515,276 | B2 * | 4/2009 | Froggatt et al. | 356/497 |
| 7,623,797 | B2 * | 11/2009 | Crivelli et al. | 398/208 |

OTHER PUBLICATIONS

Jinguji et al., Optical Half-Band Filters; Journal of Lightwave Technologies; vol. 18, No. 2, Feb. 2000; pp. 252-259.
Moreolo et al., Synthesis of Optical Wavelet Filters; IEEE Photonics Technology Letters, vol. 16, No. 7; Jul. 2004; pp. 1679-1681.

* cited by examiner

*Primary Examiner* — Linh V Nguyen
(74) *Attorney, Agent, or Firm* — Joseph Kolodka

(57) ABSTRACT

An analog to digital converter (ADC) structure and method includes a photonic filter bank having at least two filters. The at least two filters are configured to create a corresponding spectral tributary from an input signal at a target rate, and the at least two filters are configured to exhibit orthogonality properties between respective tributaries. An optical/electrical (O/E) converter is coupled to each of the at least two filters in a respective spectral tributary to convert an optical input to an electrical output. An analog to digital converter (ADC) is coupled to each of the O/E converters in a respective spectral tributary to sample the electrical output at a fraction of a target rate and to convert a sampled analog electrical output into a digital signal. A synthesis filter is coupled to each of the ADCs in a respective spectral tributary to reconstruct the input signal digitally at the target rate.

14 Claims, 2 Drawing Sheets

PHOTONIC FILTER BANK FOR HIGH-SPEED ANALOG-TO-DIGITAL CONVERSION

RELATED APPLICATION INFORMATION

This application claims priority to provisional application Ser. No. 61/042,985 filed on Apr. 7, 2008, incorporated herein by reference.

BACKGROUND

1. Technical Field

The present invention relates to analog to digital conversion of optical signals and more a particularly to high speed photonic filter methods and systems.

2. Description of the Related Art

In high-capacity, long-haul fiber data transmission, post detection processing by digital signal processing (DSP) can greatly improve transmission performance by robust compensation against chromatic dispersion (CD) and polarization mode dispersion (PMD), while doubling data capacity by allowing polarization division multiplexing (PDM) through multiple-input multiple-output (MIMO) processing. However, the unavailability of analog-to-digital converters (ADC) at high sampling rates has hindered the real time implementation of post detection DSP at high data rates. For example, 100 Gb/s applications would require sampling rates up to 30-50 GSa/s depending on the modulation format. To bridge the gap between the required sampling speed and what is commercially available, one will need the utilization of multiple ADCs through parallel processing.

Most implementations of high speed ADCs require the use of sample-and-hold circuitry in the electronic domain. In this scheme, an analog input is parallel processed and sampled in a time-interleaved fashion using multiple ADCs, where the timing signal clocking each ADC is precisely skewed. Each one of the sample-and-hold circuits has to cover the bandwidth of the input analog signal, and the timing skew used for each ADC requires extreme precision.

SUMMARY

An analog to digital converter (ADC) structure and method includes a photonic filter bank having at least two filters. The at least two filters are configured to create a corresponding spectral tributary from an input signal at a target rate, and the at least two filters are configured to exhibit orthogonality properties between respective tributaries. An optical/electrical (O/E) converter is coupled to each of the at least two filters in a respective spectral tributary to convert an optical input to an electrical output. An analog to digital converter (ADC) is coupled to each of the O/E converters in a respective spectral tributary to sample the electrical output at a fraction of a target rate and to convert a sampled analog electrical output into a digital signal. A synthesis filter is coupled to each of the ADCs in a respective spectral tributary to reconstruct the input signal digitally at the target rate.

A method for analog to digital conversion includes receiving an analog optical input signal; demultiplexing the input signal using a photonic filter bank to create a plurality of corresponding spectral tributary spectrums from a baseband of the input signal at a target rate in each of a plurality of spectral tributaries; converting the spectral tributary spectrums to an electrical output using coherence detection to preserve an orthogonal filter response of the photonic filter bank; sampling the electrical output at a fraction of the target rate and converting the electrical output from analog to digital in each spectral tributary; and synthesis filtering the digital output in each respective spectral tributary to reconstruct the input signal digitally at the target rate.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
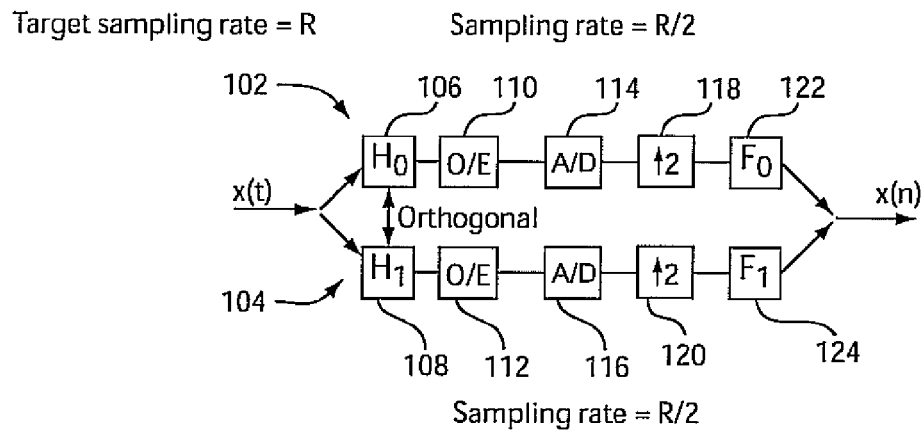
FIG. 1 is a diagram showing an analog to digital converter structure having a photonic filter bank (PFB) in accordance with the present principles.

In accordance with the present principles, a photonic filter bank (PFB) structure and method are employed to augment the speed of existing electronic analog to digital conversion (ADC) by performing parallel processing in the spectral domain instead of the temporal domain. The photonic filter bank assisted ADC relies on the "perfect reconstruction" of two or more spectrally filtered tributaries sampled in parallel using ADCs at a lower rate. The translation of a discrete filter bank and wavelet theory into the optical domain is provided, while having the reconstruction performed digitally after sampling.

In the traditional time-interleaving ADC, there are difficulties in providing high bandwidth sampling and the associated accurate timing using electronics. Therefore, the resolution, or effective number of bits (ENOB), and the overall signal bandwidth will be severely limited. By dividing the incoming signal into two or more spectral tributaries, the bandwidth requirement of each sampling ADC in the parallel structure can then be relaxed because each sampler will only need to cover the bandwidth of each tributary. Therefore, the photonic filter bank (PFB) structure can handle larger incoming signal bandwidth compared with the electronic time-interleaved scheme, accelerating the implementation of high speed data transmission with post-detection DSP.

PFB provides a way to demultiplex a high bandwidth signal directly in the optical domain into two or more signals including less information, thereby reducing the speed requirements for optical to electrical (O/E) conversion and electronics at the receiver end. The present principles become much more cost-effective as the capacity of each optical channel grows beyond, say, 100 Gb/s.

The transfer response of the photonic filters may have overlaps in spectrum. However, an orthogonal PFB design makes sure that the sampled values of the spectral tributaries do not include "information overlap" after DSP synthesis, or in other words are "alias-free."

Embodiments described herein may be entirely hardware, entirely software or including both hardware and software elements. In a preferred embodiment, the present invention is implemented in hardware but may include software elements. Software may include but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Referring now to the drawings in which like numerals represent the same or similar elements and initially to FIG. 1, a block/flow diagram shows a PFB-assisted ADC 100 with two spectral tributaries 102 and 104. The PFB-assisted ADC 100 may be implemented in an optical receiver and may be employed in optical communications systems or optical receive devices for any or plurality of applications. An incoming phase-shift-keyed (PSK) optical signal x(t) is to be sampled at a targeted rate of R for post-detection digital signal processing (DSP). Before O/E conversion in blocks 110 and 112 and sampling by analog to digital converters 114 and 116, the optical signal is first passed through a set of PFBs including at least one low-pass filter $H_0$ 106 and at least one high pass filter $H_1$ 108 using finite impulse response (FIR). The unit delay of the FIR taps is preferably proportional to the inverse of the sampling rate, R. The two filters 106 and 108 are also designed to exhibit orthogonal properties to ensure that no distortion or aliasing will occur after reconstruction in block 118 and 120.

In one embodiment, the two filtered tributaries 102 and 104 include exactly half and non-overlapping information. Coherent detection is chosen to be the method of O/E conversion in blocks 114 and 116 in order to sample the amplitude of optical filtered signal and preserve the orthogonal property of the filtered signals. Each of the two converted tributaries 102 and 104 can then be sampled and A/D converted in block 114 and 116 at half of the targeted sampling rate (R/2).

After sampling, the two discrete time signals in both paths 102 and 104 are first up-sampled in blocks 118 and 120 to the target rate by inserting zeroes between sampling values. Two digital FIR synthesis filters $F_0$, $F_1$ (122, 124) with filter responses corresponding to the PFB $H_0$, $H_1$ (106, 108) are then applied to both paths to remove the aliasing terms and to reconstruct the original signal at the target rate by adding the filtered results from block 118 and 120.

It should be understood that a PFB structure with more than two splits can be constructed by cascading filters in a tree structure where the filters with finer granularity are placed later in the tree.

The PFB structure 100 includes FIR optical filters where the unit tap delay corresponds to the target sampling rate (R), this permits the later reconstruction of optically filtered signals in discrete time using digital FIR filters. PFB is different from traditional optical filters because it selects spectral tributaries within a bandwidth (BW) of the modulated base-band signal instead of choosing a certain optical frequency span. To design orthogonal filters, the PFB employs interferometric operation, which can be implemented using a photonic lightwave circuit (PLC) or bulk optics, where signal amplitude can be added or subtracted by manipulating the phase of the optical carrier.

The amplitude information is maintained to preserve the orthogonality between the spectral tributaries 102 and 104. Therefore, the O/E conversion 110, 112 comprises coherent optical detection. A balance detector may be employed, however single-end detection is also possible through equalization for a lower cost implementation. Each of the spectral tributaries 102 and 104 can be separately sampled at a sampling rate, which is only a fraction of the target rate, depending on the number of splits the PFB provides. Direct sampling of high frequency tributaries needs to employ samplers with a high BW. These tributaries can be down converted to low frequencies by mixing them with electronic local oscillators to relax the BW requirement of the samplers 114, 116.

The PFB with interferometric filters 106, 108 provides a way to divide wide band signals into multiple tributaries for parallel sampling and A/D operation 114, 116. By synchronizing a FIR unit tap delay with the sampling rate, the samples of the original wide-band signal (x(t)) can be reconstructed digitally using discrete time FIR after parallel A/D (114, 116). Since the BW of each tributary only covers a portion of the original wide-band signal, the scheme greatly reduces the BW requirement for each individual sampler and also alleviates the difficulty of synchronization.

The orthogonality between the filtered optical signals ensures the result of perfect reconstruction (PR). The impulse response created based on the PR property will impose both intensity and phase alterations and is preserved in the O/E process 110, 112. Therefore, traditional photodiodes which convert only intensity are replaced by coherent optical detection so the phase response can be recorded as well in the O/E process 110, 112. During the sampling process 114, 116, the tributaries with higher frequency content can be down converted to low frequency bands to relax the BW requirement of the corresponding sampler.

The PFB-assisted ADC structure 100 provides a way to demultiplex a high-BW optical signal into multiple tributaries in the spectral domain for parallel sampling and A/D conversion at lower speeds. The PFB is designed with an orthogonal property so the samples of each tributary include non-overlapping information of the original signal thus perfect reconstruction at targeted sampling rate is possible in discrete time. The PFB structure 100 augments the speed of existing electronic ADC by performing parallel processing in the spectral domain instead of temporal domain. The "perfect reconstruction" includes two or more spectrally filtered tributaries sampled in parallel using ADCs at a lower rate. In accordance with the present principles, discrete filter bank theory is translated into the optical domain, while having the reconstruction performed digitally after electronic sampling. By dividing the incoming signal into two or more spectral tributaries, the bandwidth requirement of each sampling ADC in the parallel structure can then be relaxed because each sampler will only need to cover the bandwidth of each tributary. Therefore, the photonic filter bank structure can handle larger incoming signal bandwidth compared with electronic time-interleaved schemes. This accelerates the implementation of post-detection DSP for high speed optical fiber transmission. Moreover, PFB provides demultiplexing of a high bandwidth signal directly in the optical domain into two or more signals having less bandwidth and information, therefore reducing the speed requirements for O/E conversion and electronics at the receiver end. The present principles provide a cost-effective solution especially when the capacity of each optical channel grows beyond 100 Gb/s. Fundamentals of a discrete time filter bank and the perfect reconstruction (PR) property will now be described.

Figure 2:
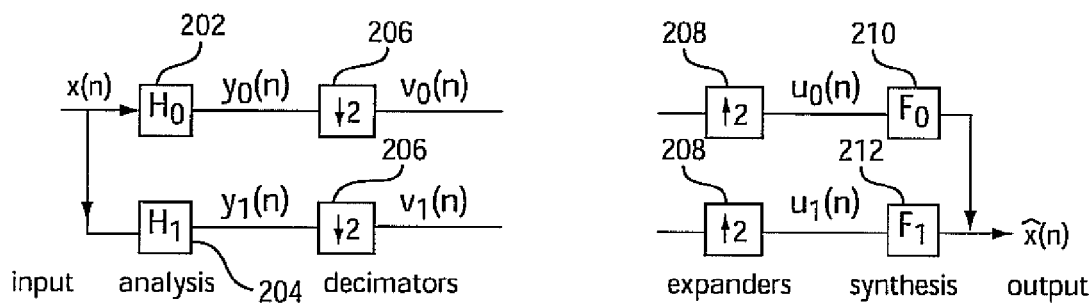
FIG. 2 is a discrete time two-filter bank structure employed to demonstrate the present principles.

Referring to FIG. 2, a structure 200 for a discrete time two-channel filter bank is shown to explain some of the present principles. An input signal x(n) will be filtered by two analysis filters $H_0$ 202 and $H_1$ 204, then down-sampled by decimators 206 for parallel processing. To reconstruct the signal after processing, the processed signals will be up-sampled by inserting zeros using expanders 208 and then recombined after the signals have passed through synthesis filters $F_0$ and $F_1$ (210 and 212). The overall z-domain response for the signal passing through this structure may be given by:

$$\hat{X}(z) = \frac{1}{2}\begin{bmatrix} H_0(z)F_0(z) + \\ H_1(z)F_1(z) \end{bmatrix} X(z) + \frac{1}{2}\begin{bmatrix} H_0(-z)F_0(z) + \\ H_1(-z)F_1(z) \end{bmatrix} X(-z) \quad (1)$$

The first term in the equation represents the distortion of the overall operation while the second term is the alias component caused by the down-sampling and up-sampling. To achieve perfect reconstruction, a general relationship between $H_0$, $H_1$, $F_0$, $F_1$ can be obtained:

$$F_0(z)=H_1(-z), F_1(z)=-H_0(-z) \quad (2)$$

$$H_1(z)=-z^{-N}H_0(-z^{-1}) \quad (3)$$

The relationship in Eq. (2) will eliminate the alias term in Eq. (1), while the condition in Eq. (3) will reduce the overall response to $\hat{X}(z)=z^{-k}X(z)$, where k is an arbitrary integer resulting an overall delay to the input signal. By implementing the filter bank structure using finite impulse response (FIR) filters, where N is the order of the FIR filter, Eq. (3) simply states that $H_1$ 204 is the alternating flip of $H_0$ 202. That is to say, if the impulse response of $H_0$ is (h(0),h(1),h(2), h(3), . . . ,h(N)), then the impulse response of $H_1$ will be (h(N),-h(N-1),h(N-2),-h(N-3), . . . ). The filter banks designed by this method are orthogonal, and the FIR design which corresponds to the flattest response is characterized by Daubechies wavelets.

Figure 3:
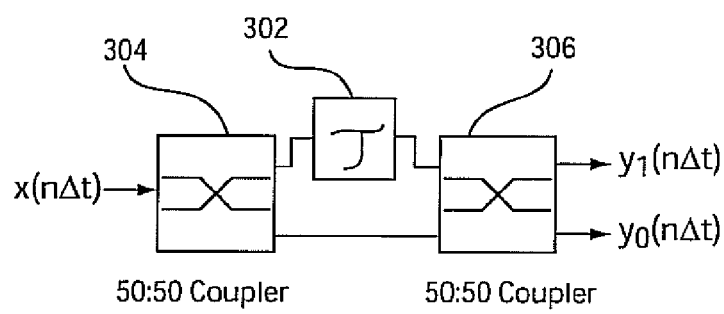
FIG. 3 is an example of an orthogonal filter for use in the PFB in accordance with one embodiment.

Referring to FIG. 3, a photonic filter bank (PFB) structure 100 is illustratively shown in greater detail. The orthogonal FIR analysis filters described above can be implemented in the optical domain using optical path delays 302 and interferometric couplers 304, 306. For simplification, we describe the construction of the simplest case of orthogonal filter bank known as a Haar's wavelet transform. The impulse response of the one-tap filter bank is (½,½) for $H_0$ and (½,-½) for $H_1$. One can see that $H_0$ and $H_1$ follow the relation described in Eq. (3) (such that the structure of the PFB creates orthogonal impulse responses). Assuming the input x(t) is band-limited, we are interested at x(t) values at discrete time t=nΔτ only because it will eventually be sampled by an ADC at the rate of 1/Δτ higher than the Nyquist rate. The signal was split by a 50:50 coupler 304 into two paths then recombined by another 50:50 coupler 306 after one of the path experienced a phase-sensitive delay Δτ (302). The transfer matrix of the PFB can be written as:

$$S = \begin{bmatrix} 1/\sqrt{2} & j/\sqrt{2} \\ j/\sqrt{2} & 1/\sqrt{2} \end{bmatrix} \begin{bmatrix} e^{-j\omega\Delta\tau} & 0 \\ 0 & 1 \end{bmatrix} \begin{bmatrix} 1/\sqrt{2} & j/\sqrt{2} \\ j/\sqrt{2} & 1/\sqrt{2} \end{bmatrix} \quad (4)$$

By replacing the term $e^{j\omega\Delta\tau}$ with z and applying a proper phase shift at the outputs, we can immediately obtain the z-domain response for $y_0$ and $y_1$:

$$\begin{bmatrix} y_1(n\Delta\tau) \\ y_0(n\Delta\tau) \end{bmatrix} = \begin{bmatrix} \frac{1}{2} - \frac{1}{2}z^{-1} \\ \frac{1}{2} + \frac{1}{2}z^{-1} \end{bmatrix} x(n\Delta\tau) \quad (5)$$

From the filter response in Eq. (5), it can be confirmed that the PFB structure does create the orthogonal filter response described by Haar's wavelet. After the amplitudes of $y_0(t)$ and $y_1(t)$ are sampled at the interval of 2Δτ, one can then reconstruct original signal x(nΔτ) by the synthesizing method described earlier. The amplitude, not just intensity, of the filtered optical signals needs to be sampled. The PFB structure, which is very similar to the design of delay interferometer for differential phase-shift-key (DPSK) receiver, can be either implemented using a silica planar lightwave circuit (PLC) or bulk optics. Due to the nature of interferometry, the performance of PFB will depend on the phase error created by drift and linewidth of the laser after passing through the designed optical path delay. A quick calculation shows that, for operation at Δτ=20 ps (50 Gs/s) with phase error less than 0.01π, one should choose a laser with drift/linewidth less than 0.25 GHz. Orthogonal FIR filters with multiple taps, which will have better filter characteristics such as faster roll-off and flat pass-band, can be constructed using a similar optical interferometric structure.

Figure 4:
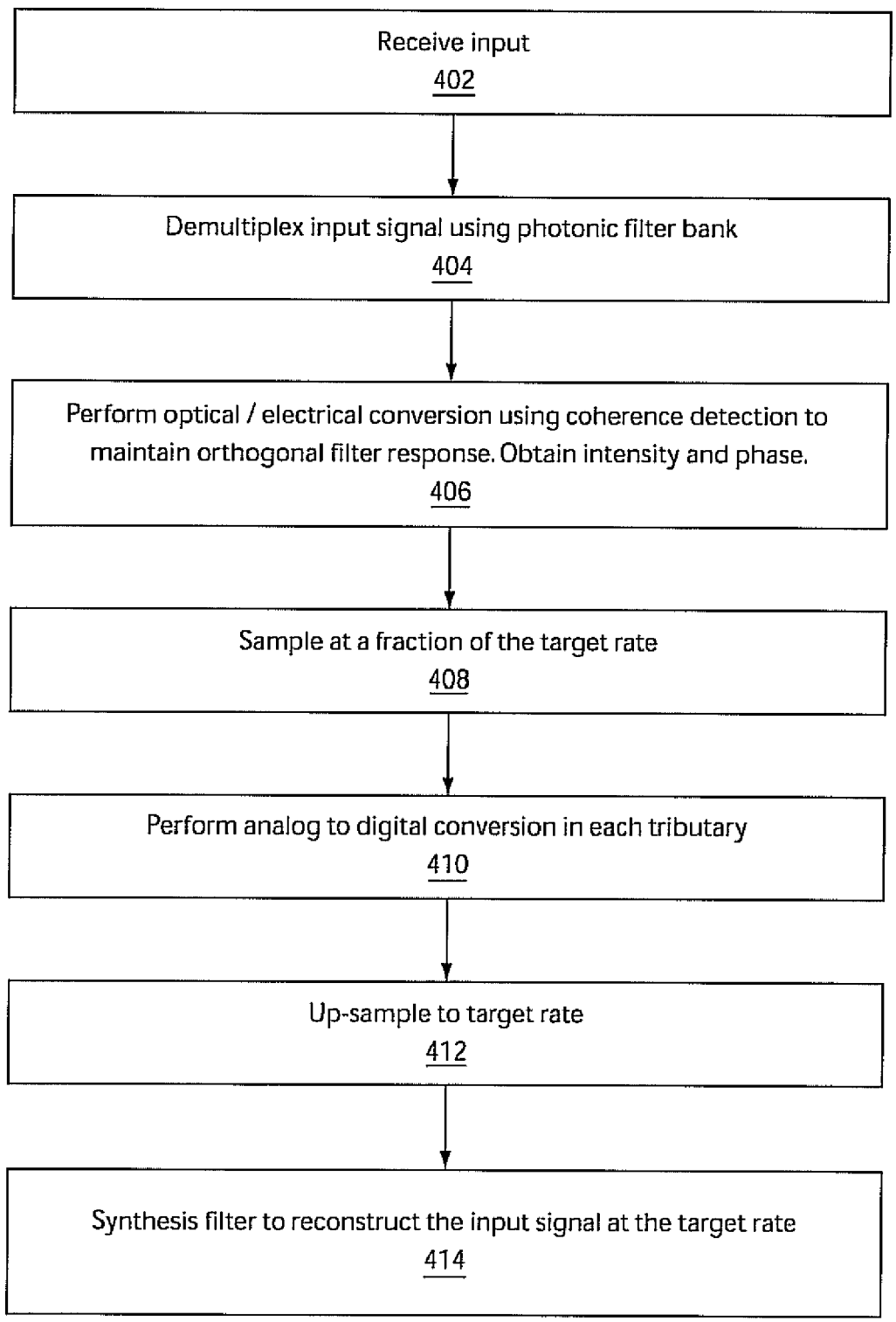
FIG. 4 is a block/flow diagram showing a system/method for analog to digital conversion in accordance with one illustrative embodiment.

Referring to FIG. 4, a method for analog to digital conversion in accordance with the present principles is illustratively depicted. In block 402, an analog optical input signal is received. The input signal may include a phase shift keyed signal (PSK) or other modulated optical signals. In block 404, the input signal is demultiplexed using a photonic filter bank to create a plurality of corresponding spectral tributary spectrums from the input signal at a target rate in each of a plurality of spectral tributaries.

In block 406, the spectral tributary spectrums are converted to an electrical output using coherence optical detection to preserve an orthogonal filter response of the photonic filter bank. Intensity and phase are both recorded to preserve the orthogonal filter response. Coherent detection records in-phase amplitude and quadrature amplitude of the signal. The in-phase amplitude and quadrature amplitude of the signal are employed to obtain the intensity and phase. DSP synthesis of the sampled points is based on these amplitudes which correlate to the phase and intensity. In block 408, the electrical output is sampled at a fraction of the target rate. The sample rate depends on the number of spectral tributaries employed.

In block 410, the electrical output is converted from analog to digital in each spectral tributary. In block 412, the digital output may be up-sampled to restore the target rate.

In block 414, the digital output is synthesis filtered in each respective spectral tributary to reconstruct the input signal digitally at the target rate. The signals on each tributary are combined to reconstruct the signal, and the method maintains a perfect reconstruction property. Synthesis filtering preferably includes employing finite impulse response filters (FIR).

Having described preferred embodiments of a photonic filter bank and method for high-speed analog-to-digital conversion (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims.

Having thus described aspects of the invention, with the details and particularity required by the patent laws, what is claimed and desired protected by Letters Patent is set forth in the appended claims.

What is claimed is:

1. An analog to digital converter (ADC) structure, comprising,
a photonic filter bank having at least two filters, the at least two filters configured to create a corresponding spectral tributary from a baseband of an input signal at a target rate and the at least two filters configured to exhibit orthogonality properties between respective tributaries;
an optical/electrical (O/E) converter coupled to each of the at least two filters in a respective spectral tributary to convert an optical input to an electrical output;
an analog to digital converter (ADC) coupled to each of the O/E converters in a respective spectral tributary to sample the electrical output at a fraction of a target rate and to convert a sampled analog electrical output into a digital signal; and
a synthesis filter coupled to each of the ADCs in a respective spectral tributary to reconstruct the input signal digitally at the target rate wherein said photonic filter-bank comprising an operation phase delay $\Delta t$ of 20 ps(50 Gs/s) with a phase error of less than $0.1\pi$ in response to a laser of said input signal having a drift/linewidth of less than 0.25 GHz.

2. The ADC structure as recited in claim 1, wherein the synthesis filters include finite impulse response filters (FIR).

3. The ADC structure as recited in claim 1, further comprising an up-sampler coupled to the ADCs to restore an output of the ADCs to the target rate.

4. The ADC structure as recited in claim 1, wherein the structure maintains a perfect reconstruction property.

5. The ADC structure as recited in claim 1, wherein the fraction of a target rate is based upon a number of spectral tributaries in the structure.

6. A receiver, comprising:
a demultiplexer configured to demultiplex an optical input signal, the demultiplexer including a photonic filter bank having at least two filters, the at least two filters configured to create a corresponding spectral tributary from the input signal at a target rate and the at least two filters configured to exhibit orthogonality properties between respective tributaries;
an optical/electrical (0/E) converter coupled to each of the at least two filters in a respective spectral tributary to convert an optical input to an electrical output;
an analog to digital converter (ADC) coupled to each of the O/E converters in a respective spectral tributary to sample the electrical output at a fraction of a target rate and to convert a sampled analog electrical output into a digital signal; and
a finite impulse response (FIR) synthesis filter coupled to each of the ADCs in a respective spectral tributary to reconstruct the input signal digitally at the target rate such that the input signal is converted to a digital electrical signal at the target rate wherein said photonic filter-bank comprising an operation phase delay $\Delta t$ of 20 ps(50 Gs/s) with a phase error of less than $0.1\pi$ in response to a laser of said input signal having a drift/linewidth of less than 0.25 GHz.

7. The ADC structure as recited in claim 6, further comprising an up-sampler coupled to the ADCs to restore an output of the ADCs to the target rate.

8. The ADC structure as recited in claim 6, wherein the fraction of a target rate is based upon a number of spectral tributaries in the structure.

9. The ADC structure as recited in claim 6, wherein the structure maintains a perfect reconstruction property.

10. A method for analog to digital conversion, comprising:
receiving an analog optical input signal;
demultiplexing the input signal using a photonic filter bank to create a plurality of corresponding spectral tributary spectrums from a baseband of the input signal at a target rate in each of a plurality of spectral tributaries;
converting the spectral tributary spectrums to an electrical output using coherence detection to preserve an orthogonal filter response of the photonic filter bank;
sampling the electrical output at a fraction of the target rate and converting the electrical output from analog to digital in each spectral tributary; and
synthesis filtering the digital output in each respective spectral tributary to reconstruct the input signal digitally at the target rate wherein said photonic filter-bank comprising an operation phase delay $\Delta t$ of 20 ps(50 Gs/s) with a phase error of less than $0.1\pi$ in response to a laser of said input signal having a drift/linewidth of less than 0.25 GHz.

11. The method as recited in claim 10, wherein converting the spectral tributary spectrums includes gathering intensity and phase information to preserve the orthogonal filter response.

12. The method as recited in claim 10, further comprising up-sampling the digital output to restore the target rate.

13. The method as recited in claim 10, wherein the fraction of a target rate is based upon a number of spectral tributaries.

14. The method as recited in claim 10, further comprising maintaining a perfect reconstruction property.

* * * * *